Oct. 12, 1943.            R. L. LINCOLN            2,331,786
                            DUST COLLECTOR
                          Filed Feb. 24, 1941
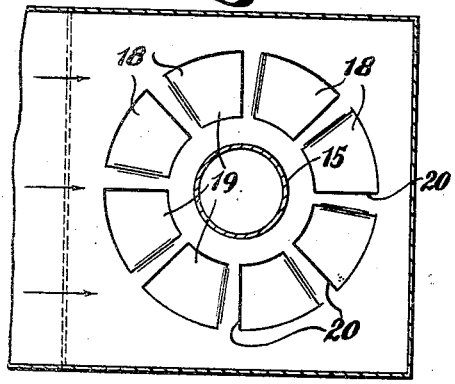
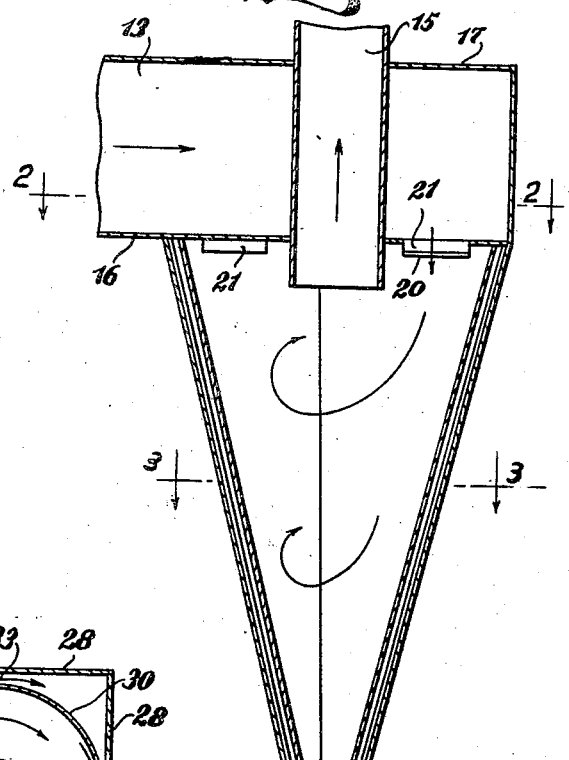
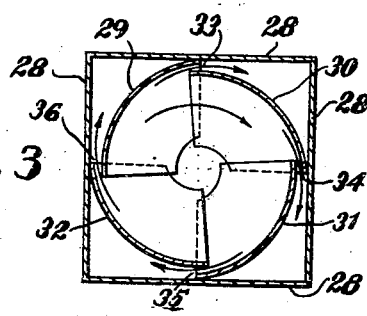
INVENTOR
ROLAND L. LINCOLN
BY Robert T. Palmer
ATTORNEY Patented Oct. 12, 1943

2,331,786

UNITED STATES PATENT OFFICE 2,331,786

DUST COLLECTOR

Roland L. Lincoln, Dedham, Mass., assignor to
B. F. Sturtevant Company, Boston, Mass.

Application February 24, 1941, Serial No. 380,134

3 Claims. (Cl. 183—83)

This invention relates to concentrators and separators, and relates more particularly to concentrators and separators for removing solid particles such as dust and cinders, from gases such as flue gases, from steam power and other industrial plants.

According to this invention the gases containing the solid particles to be separated are caused to flow in circular paths, the solid particles being thrown out by centrifugal force. The invention is suitable for use as a single unit utilizing one flow passage or as a multiple unit utilizing a plurality of flow paths in parallel.

A feature of one embodiment of the invention resides in providing a single unit separator with its walls in the shape of a pyramid having rectangular cross-sections and having internal curved walls with one or more tangential outlet channels therebetween for the separation of the solid particles.

Objects of the invention are to increase the efficiency of separation in, and to decrease the cost of, separators for removing solid particles from gases.

The invention will now be described with reference to the drawing, of which:

Fig. 1 is a side elevation in section, of an embodiment of a single unit collector according to this invention;

Fig. 2 is an enlarged sectional view taken along the line 2—2 of Fig. 1, and

Fig. 3 is a sectional view taken along the line 3—3 of Fig. 1.

The lower portion of the separator of Figs. 1-3, below the outlet tube 15 and the whirl imparting tongues 21 is formed as illustrated by Figs. 1 and 3 as a pyramid, square in cross-section. Prior collectors utilized a cylindrical separator casing with a converging hopper connected to the under portion thereof. The present construction results in decreased fabricating cost and in increased efficiency.

The outer walls 28 are straight and form a pyramid, square in cross-section. Contained within the walls 28 are the curved walls 29, 30, 31, and 32 which preferably are formed as similar conical segments, each extending in section, in an arc which is a fraction over one-fourth of a similar circle, the center of each being displaced with reference to the centers of the others so that the channel 33 is formed between the adjacent ends of the arcs 29 and 30, the channel 34 is formed between the adjacent ends of the arcs 30 and 31, the channel 35 is formed between the adjacent ends of the arcs 31 and 32, and the channel 36 is formed between the adjacent ends of the arcs 32 and 29.

The gas entering the duct 13 under pressure, is given a clock-wise whirl by the tongues 21 and travels around the interior surfaces of the arc shaped inner walls 29, 30, 31 and 32 so that the solid particles are thrown out by centrifugal force, into the channels 33, 34, 35 and 36 and thence into the corner spaces of the hopper.

While one embodiment of the invention has been described for the purpose of illustration, it should be understood that the invention is not limited to the exact apparatus and arrangements of apparatus described as modifications thereof may be suggested by those skilled in the art without departure from the essence of the invention.

What is claimed is:

1. A separator for removing solid particles from a gas, comprising a substantially vertically extending casing, means for admitting gas into said casing and for imparting a rotary motion in the casing to the gas, means including a converging inner wall forming a substantially conical flow passage extending downwardly within said casing below said means and receiving rotating gas therefrom, said wall having a plurality of downwardly extending, tangentially disposed skimming channels formed therein, and a gas outlet tube extending through the upper portion of said casing into the space within said flow passage, said casing having converging outer walls extending completely around and spaced from said inner wall at a plurality of points and forming passages at said points for solid particles, said channels discharging said particles into said passages.

2. A separator for removing solid particles from a gas, comprising a substantially vertically extending casing, means for admitting gas into said casing and for imparting a rotary motion in the casing to the gas, means including a converging inner wall forming a substantailly conical flow passage extending downwardly within said casing below said means and receiving rotating gas therefrom, said wall having a plurality of downwardly extending, tangentially disposed skimming channels formed therein, a gas outlet tube extending through the upper portion of said casing into the space within said flow passage, said casing having lower converging, outer walls rectangular in cross-sections around and spaced from said inner wall at the corners formed by said outer walls and forming passages at said corners around said inner wall, for solid particles, said channels discharging solid particles into said passages.

3. A separator for removing solid particles from a gas, comprising a substantially vertically extending casing, means for admitting gas into said casing and for imparting a rotary motion in the casing to the gas, a plurality of separate curved walls formed as conical segments, extending downwardly within said casing below said means and receiving rotating gas therefrom, said walls in section forming arcs of substantially similar eccentric circles, said walls forming therebetween a plurality of downwardly extending, tangentially disposed skimming channels, said casing having converging lower walls, rectangular in cross-section, forming a hopper, said converging lower walls and said curved walls being spaced apart at the corners formed by said lower walls and forming in said corners, discharge passages for solid particles, and a gas outlet tube extending through the upper portion of said casing into the space between said curved walls, said channels discharging solid particles into said passages.

ROLAND L. LINCOLN.